United States Patent

Ozaki et al.

[11] Patent Number: 6,116,611
[45] Date of Patent: Sep. 12, 2000

[54] TUBULAR PACKING AND METHOD OF PRODUCING SAME

[75] Inventors: Kouki Ozaki; Masatoshi Inoue; Shigehiro Kawai; Yutaka Yamada; Hideyumi Matsumura; Takayuki Shibayama, all of Nagoya, Japan

[73] Assignee: Daido Metal Company Ltd., Nagoya, Japan

[21] Appl. No.: 09/084,220

[22] Filed: May 26, 1998

[30] Foreign Application Priority Data

Jul. 14, 1997 [JP] Japan ................................ 9-205382

[51] Int. Cl.⁷ ..................................... B32B 17/06
[52] U.S. Cl. ........................ 277/396; 277/627; 277/591
[58] Field of Search .................... 277/591, 592, 277/598, 608, 627, 634, 631

[56] References Cited

U.S. PATENT DOCUMENTS

| | | | |
|---|---|---|---|
| 4,607,851 | 8/1986 | Usher | 277/627 |
| 5,040,805 | 8/1991 | Ozora | 277/627 |
| 5,451,064 | 9/1995 | Mercuri et al. | 277/627 |
| 5,462,291 | 10/1995 | Maeda et al. | 277/100 |

FOREIGN PATENT DOCUMENTS

60-084477  5/1985  Japan .
1-307591  12/1989  Japan .

Primary Examiner—Anthony Knight
Assistant Examiner—Mark Williams
Attorney, Agent, or Firm—Browdy and Neimark

[57] ABSTRACT

There is disclosed a tubular packing which can be easily produced, and has satisfactory durability while maintaining excellent properties of exfoliated graphite such as cushioning properties and heat-resistance. There are prepared a sheet of exfoliated graphite sheet and two wire nets equal in size and shape to the sheet. The one wire net is superposed on an obverse side of the sheet in coinciding relation thereto whereas the other wire net is held in contact with a reverse side of the sheet in offset relation thereto, and this stack is curved into a tubular shape, and this tubular stack is compressed in a direction of a thickness of the sheet, thereby forming a tubular packing. Therefore, in the resultant tubular packing, the wire nets are embedded in the sheet. The wire net interconnects the opposite end edges of the sheet in a bridging manner, so that the tubular packing is continuous over the entire circumference thereof. The embedded wire nets are exposed respectively to the inner and outer surfaces of the sheet, and the wire net and the exfoliated graphite are present in a coexisting manner in each of the inner and outer peripheral surfaces of the tubular packing, and therefore the tubular packing has the excellent wear resistance and sliding properties.

8 Claims, 6 Drawing Sheets

TUBULAR PACKING AND METHOD OF PRODUCING SAME

BACKGROUND OF THE INVENTION

1. Field of the Invention

This invention relates to a tubular packing to be interposed between members in sliding contact with each other, and also relates to a method of producing this tubular packing.

2. Related Art

JP-A-60-84477 (prior art technique 1) discloses a sliding member such as a packing, which is produced by the steps of placing both of a band-like matrix and a band-like, sliding face-forming member one upon the other (that is, stacked together), and compressing and deforming them so that metal wires are partially exposed to the surface of the sliding member. The tubular matrix is formed by superposing a wire net of a thin stainless steel wire on a heat-resistant sheet material made, for example, of exfoliated graphite, and then by curling these members into a roll-like configuration, and then by crushing and flattening this rolled shaped members into a band-like configuration. The sliding face-forming member is formed by the steps of placing a powdered solid lubricant such as asbestos on an exfoliated graphite sheet, overlaying them with a composite net (formed by weaving or knitting a thin metal wire and a fluororesin thread together), and crushing and flattening them into a band-like configuration. Then, the two members thus produced are stacked together, and are compressed and shaped into the tubular packing. Therefore, this sliding member has the sliding surface in which the fluororesin, the thin metal wire and the solid lubricant are present in a co-existing manner, and therefore this sliding member exhibits excellent sliding properties over a long period of time.

A tubular packing, disclosed in JP-A-1-307591 (prior art technique 2), is formed by superposing one wire net (expanded metal) on one sheet of exfoliated graphite, and then by curling these into a roll-like configuration, and then by compressing (in a direction of the thickness thereof) and shaping this into a final shape of the tubular packing. Therefore, the tubular packing can be easily produced, and is less susceptible to damage.

In both of the sheet materials (tubular packings) of prior art techniques 1 and 2, the wire net and the exfoliated graphite sheet are stacked together, and then are curled into a roll-like configuration. Therefore, each of the resultant sheet materials has an increased thickness, and there has been a limit to the formation of these sheet materials into a reduced thickness. Besides, the structure of these sheet materials is complicated, and their cost is high.

There is already known a sliding sheet material of the type in which one wire net is superposed on one exfoliated graphite sheet, and then these are compressed in a direction of the thickness thereof, so that the wire net is embedded in the exfoliated graphite sheet, with the exfoliated graphite filled in the meshes (interstices) in the wire net. In this sliding sheet material, the wire net is covered with the exfoliated graphite, and the wire net is not exposed to the surface of the sliding sheet material. A tubular packing can be formed by cutting this sliding sheet material into a predetermined shape, and then by curving or bending this sheet, and then by shaping this sheet into a tubular shape of the packing.

In this tubular packing, when the exfoliated graphite sheet is worn into a reduced thickness, this causes a backlash. Besides, when the exfoliated graphite sheet is worn to such an extent that the wire net is exposed to inner and outer peripheral surfaces of the packing, the exfoliated graphite sheet comes to be severed for each mesh of the wire net, which results in a problem that the exfoliated graphite sheet is liable to separation. Furthermore, opposite end edges of the curved sheet material are not continuous with each other when the tubular packing is formed by use of the sheet, and therefore when a twisting force acts on the tubular packing, there occurs such a fear as this tubular packing is easily twisted and deformed.

SUMMARY OF THE INVENTION

It is therefore an object of this invention to provide a tubular packing for high-temperature use which can be easily produced, and has satisfactory durability while maintaining excellent properties of exfoliated graphite such as cushioning properties and heat-resistance.

According to the first aspect of the invention, there is provided a tubular packing comprising a tubular exfoliated graphite, and a plurality of layers of wire net embedded therein, said tubular exfoliated graphite having abutting opposite end edges, at least one of the wire net layers bridging the end edges.

In this construction, since the exfoliated graphite sheet is curved into a tubular shape, it becomes possible to provide the tubular packing having a reduced thickness corresponding to the thickness of one exfoliated graphite sheet. Further, one of the wire net layers embedded in the sheet bridges the gap defined by the opposite end edges of the tubular shape, so that the tubular packing has the continuous circumferential surface. Therefore, the tubular packing, even when subjected to a twisting force, is less liable to be deformed, and hence has high shape retention. Even when the exfoliated graphite at the inner and outer peripheral surfaces of the tubular packing is so worn that the wire net layers are exposed to these surfaces, the exfoliated graphite sheet will not be severed for each mesh of the wire nets because the plurality of wire net layers are embedded in the sheet, and therefore the exfoliated graphite sheet is less susceptible to separation.

Particularly in a case where the embedded wire net layers are exposed respectively to the inner and outer surfaces of the sheet so the exposed wire net layers and the exfoliated graphite are present in a manner coexisting with the exfoliated graphite in each of the inner and outer peripheral surfaces of the tubular packing, the tubular packing comes to have excellent wear resistance and sliding properties, and therefore a backlash is less liable to occur for a long period of time (, which is the second aspect of the invention).

The wire net layers increase the holdability of the sheet-shaped exfoliated graphite, and also increase a mechanical strength of the tubular packing. Preferably, regarding the wire net layers, it is preferred to use an expanded metal sheet or a plain-weave wire net in which intersections of warp threads and weft threads are interconnected. The reason for this is that the warp thread and the weft thread at the intersection will not be displaced with respect to each other upon application of a shearing force to the sheet, so that the holdability of the exfoliated graphite sheet is enhanced. Particularly, the expanded metal sheet is formed by forming slits in a metal sheet in a staggered manner, and then by expanding this metal sheet, so that the resultant expanded metal sheet has sharp edges, and therefore the expanded metal sheet has the enhanced ability of holding the exfoliated graphite sheet.

The exfoliated graphite exhibits excellent properties such as cushioning properties and heat resistance, and also possesses excellent conformability with the mating material.

When an exfoliated graphite sheet slides in contact with the mating material, there sometimes occurs a discontinuous slip phenomenon called "stick slip" since the exfoliated graphite has a friction coefficient higher than ordinary graphite. In a case where noises (abnormal sound) occurs due to this stick slip, it is preferred that a solid lubricant, such as graphite, boron nitride and calcium fluoride, be added to the exfoliated graphite so as to lower its friction coefficient.

A binder, such as a phenolic resin, an epoxy resin, a polyimide resin, a polyamide-imide resin can be added to exfoliated graphite so as to further enhance the holdability of the exfoliated graphite, and also vermiculite can be added so as to enhance the heat resistance.

For producing the tubular packing according to the first aspect of the invention, the exfoliated graphite sheet cut into a predetermined shape and a plurality of wire nets equal in shape to this sheet are prepared, and at least one of the wire nets is put on each of the opposite (obverse and reverse) sides of the sheet so that the edges of each of the wire net and the graphite sheet may be trued up. Further, at least one of the wire nets is superposed on the sheet so that the wire net is projected from the graphite sheet without being trued up. Then, the resultant stack is curved into a tubular shape with the opposite end edges of the sheet butted together, so that a wire net portion projecting from one end of the sheet, is also superposed on the other end portion of the sheet.

Then, by compressing and forming this tubular stack in a direction of the thickness of the sheet, the wire nets come to be embedded in the sheet. As a result, the part of the offset wire net interconnects the opposite end edges of the sheet in a bridging manner, so that the tubular packing, having the continuous circumferential surface, is produced (, which is the third aspect of the invention).

A tubular packing according to the fourth aspect of the invention is formed by the step of folding a sheet-shaped exfoliated graphite (which has wire nets embedded therein) in half, and curving the folded graphite into a tubular shape so that the abutting end edges of the tubular graphite are connected by a connecting piece inserted in the half-folded sheet at the inner side thereof and so that the opposite end edges of the graphite are bridged.

The sheet-shaped exfoliated graphite is folded in half in this case. Thus, even in a case where one wire net is embedded in the graphite, the tubular packing has a construction similar to that in which at least two wire net layers exist in the exfoliated graphite, and even when the exfoliated graphite sheet is so worn at its surfaces that the wire net becomes exposed, the exfoliated graphite sheet will not be severed for each mesh of the wire net layers, and therefore in this tubular packing, the exfoliated graphite sheet is less susceptible to separation.

The connecting piece interconnects the opposite end edges of the tubular packing in a bridging manner, so that the circumferential surface of the tubular packing is continuous. Therefore, the tubular packing, even when subjected to a twisting force, is less liable to be deformed, and hence has the high shape retention.

Particularly, in a case where the exposed wire net layer portion and the exfoliated graphite are present in a coexisting manner in each of the inner and outer surfaces of the folded sheet, the tubular packing has the excellent wear resistance and sliding properties (, which is the fifth aspect of the invention).

The tubular packing according to the fourth aspect of the invention is produced by the steps of preparing an exfoliated graphite sheet cut into a predetermined shape, preparing wire net having the substantially same shape as this sheet, stacking the wire net on one side of the sheet so that the end edges of the wire net and the exfoliated graphite sheet are trued up, and then folded them in half while inserting a connecting piece in the inside of the folded sheet in such a manner that the connecting piece projects from the edges of one end of the sheet. Then, the stack is curved and formed into a tubular shape, with the opposite end edges of the sheet butted together, in such a manner that portion of the connecting piece projecting from the one end edge of the sheet extends between other edges of another end of the folded sheet. Then, this tubular stack is compressed in a direction of the thickness of the sheet, so that the wire net is embedded in the sheet and that the opposite end edges of the sheet are interconnected in a bridging manner by the connecting piece, thereby producing the tubular packing having the continuous circumferential surface (, which is the sixth aspect of the invention).

In this case, by using an exfoliated graphite sheet in which the wire net had been previously embedded therein, the half-folding of the sheet and the curving of the sheet can be effected easily (, which is the seventh aspect of the invention). Furthermore, by embedding the wire net aside to one surface of the graphite sheet and by folding it in half in such a manner that the wire net is disposed at the outside, it becomes possible to produce a tubular packing in which the wire net is embedded in the vicinity of both of the inner and outer surfaces of the tubular packing.

In the tubular packing according to the first aspect of the invention, the plurality of wire nets are embedded in the exfoliated graphite sheet, and this sheet is curved into a tubular shape, and at least one of the wire nets interconnects the opposite end edges of the sheet in a bridging manner. Therefore, the tubular packing has the high shape retention.

Particularly, in a case where the exposed wire net (embedded in the exfoliated graphite sheet) and the exfoliated graphite are exposed in a coexisting manner to each of the inner and outer surfaces of the sheet, the tubular packing has the excellent wear resistance and sliding properties, and a backlash is less liable to occur for a long period of time (, which is the second aspect of the invention).

In the method according to the third aspect of the invention for producing the tubular packing of the invention, the tubular packing can be easily formed by the sheet and the wire nets through one compression shaping operation.

In the tubular packing according to the fourth aspect of the invention, the exfoliated graphite sheet having the wire net embedded therein, is folded in half, and then is curved into a tubular shape. The connecting piece inserted in the half-folded sheet interconnects the opposite edges of the sheet in a bridging manner, and the tubular packing has the high shape retention.

Particularly, by exposing the wire net portions to both the surface of the exfoliated graphite so that the wire net portions and the exfoliated graphite coexist on the inner and outer surfaces of the half-folded sheet, the tubular packing comes to have the excellent wear resistance and sliding properties, and a backlash is less liable to occur for a long period of time (, which is the fifth aspect of the invention).

In the method according to the sixth and seventh aspects of the invention, the tubular packing can be easily produced by the sheet and the wire net through one compression shaping operation.

Particularly in the method according to the seventh aspect of the invention, the exfoliated graphite sheet having the wire net beforehand embedded therein, so that the tubular packing can be produced more easily.

DESCRIPTION OF THE PREFERRED EMBODIMENTS

Two embodiments of tubular packings of the invention to be provided at an interconnecting portion of an exhaust conduit of an automobile will be described in detail.

Figure 1:
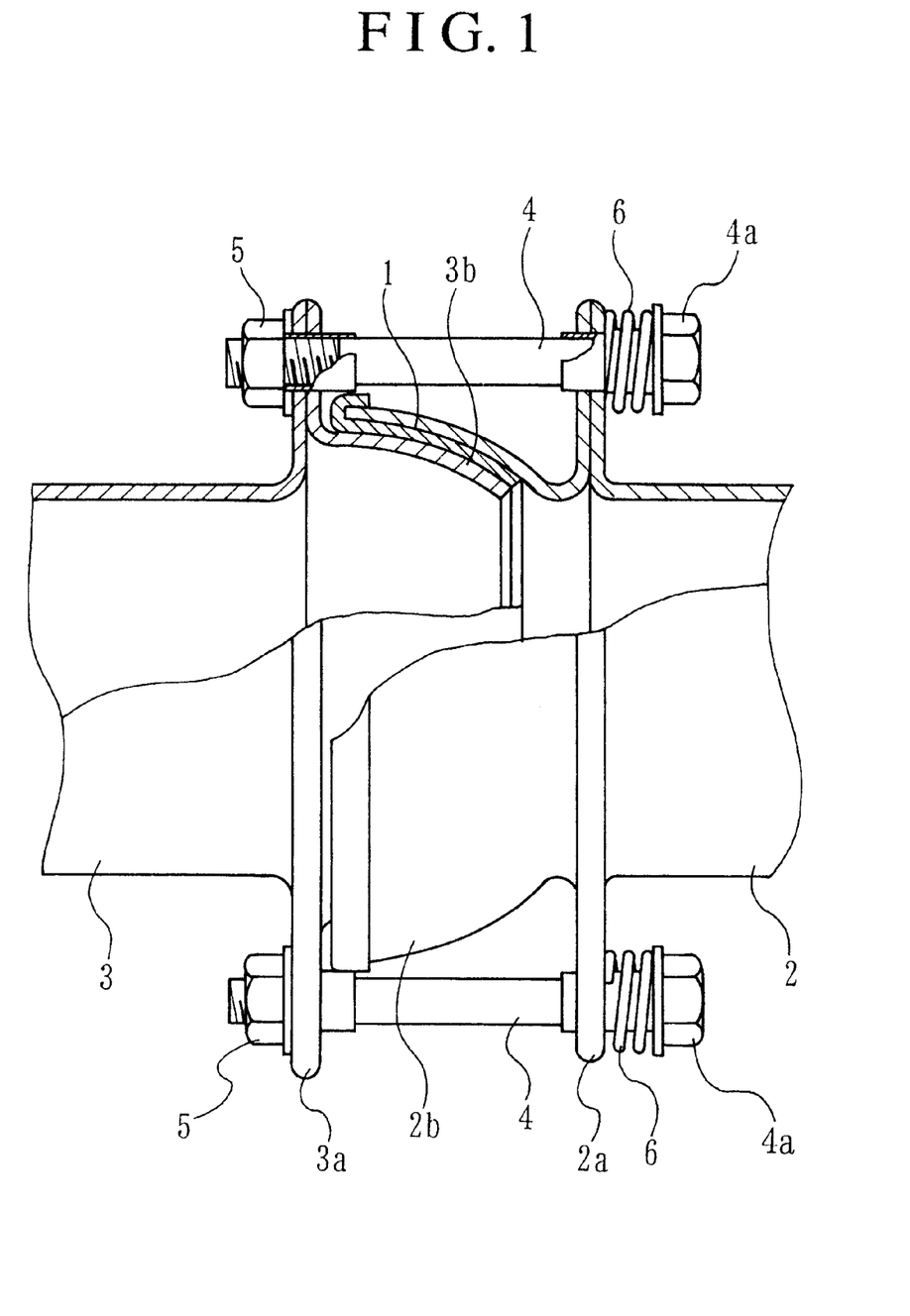
FIG. 1 is a partly-broken, cross-sectional view of an exhaust conduit.

Referring first to FIG. 1 which shows the interconnecting portion of the exhaust conduit of the automobile at which the tubular packing 1 is provided, a flange 2a is provided at an end of an engine-side exhaust pipe (outer pipe) 2, and an outer spherical portion 2b, bulged into a generally semi-spherical shape, is formed on this flange 2a. A flange 3a is provided at an end of an exhaust-side exhaust pipe (inner pipe) 3, and an inner spherical portion 3b of a generally semi-spherical shape is formed on this flange 3a, and the inner spherical portion 3b is disposed in contiguous relation to an inner surface of the outer spherical portion 2b. The inner spherical portion 3b has a plurality of slits (not shown) which impart resiliency (i.e., spring properties) to the inner spherical portion 3b. The inner spherical portion 3b is inserted into the outer spherical portion 2b, with the tubular packing 1 of a generally bell-shape (see FIG. 2) interposed therebetween, and the flanges 2a and 3a are interconnected by bolts 4 and nuts 5, thus serially connecting the outer and inner spherical portions 2b and 3b. A compression spring 6 is interposed between the flange 2a and a head 4a of each bolt 4, and these compression springs 6 resiliently press the outer pipe 2 and the inner pipe 3 against each other.

First Embodiment

Figure 3:
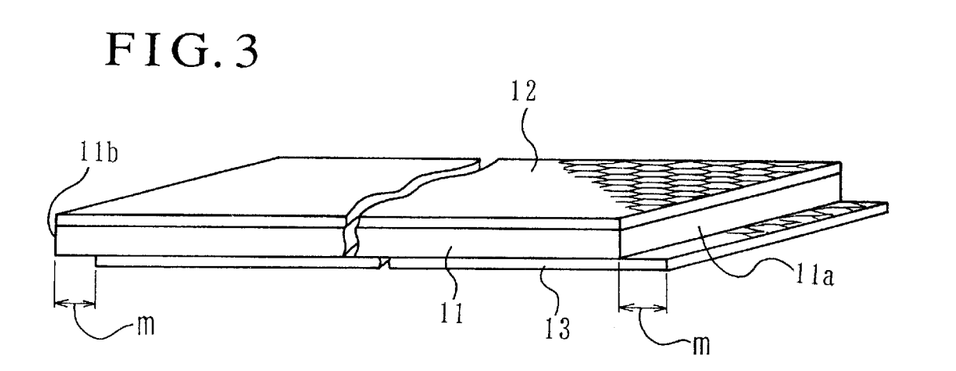
FIG. 3 is a perspective view showing a sheet and wire nets stacked together in a first embodiment of the invention.
Figure 4:
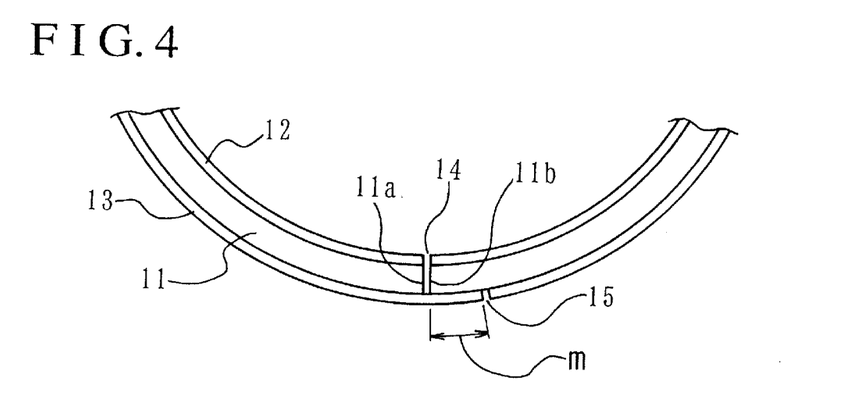
FIG. 4 is a fragmentary, enlarged, front-elevational view showing the sheet and the wire nets curved into a tubular shape.

A method of producing a tubular packing 1 embodying the invention will now be described. Two expanded metal sheets 12 and 13 each having a thickness of 0.3 mm were put or stacked respectively on opposite (obverse and reverse) sides of faces of an exfoliated graphite sheet 11 (which was sold under the name of "EPX Sheet" by Nippon Kokuen Kogyo Company) of a generally rectangular shape having a thickness of 0.8 mm, as shown in FIG. 3, the expanded metal sheets 12 and 13 having the same shape as those of the exfoliated graphite sheet 11. At this time, one expanded metal sheet 12 was superposed on the sheet 11 while truing up the opposite end edges of both the sheet 11 and the expanded metal sheet 12, whereas the other expanded metal sheet 13 was made to project from the edge of the sheet 11 by an amount (length) m. Then, the three sheets, thus stacked together, were curved and formed into a cylindrical shape, with the opposite end edges 11a and 11b of the sheet 11 butted together. As a result, the terminal portion of the expanded metal sheet 13 projected an amount m from the sheet 11 was disposed at a position 15 spaced a distance m from a line 14 of juncture defined between the opposite end edges 11a and 11b of the sheet 11, as shown in FIG. 4.

Figure 2:
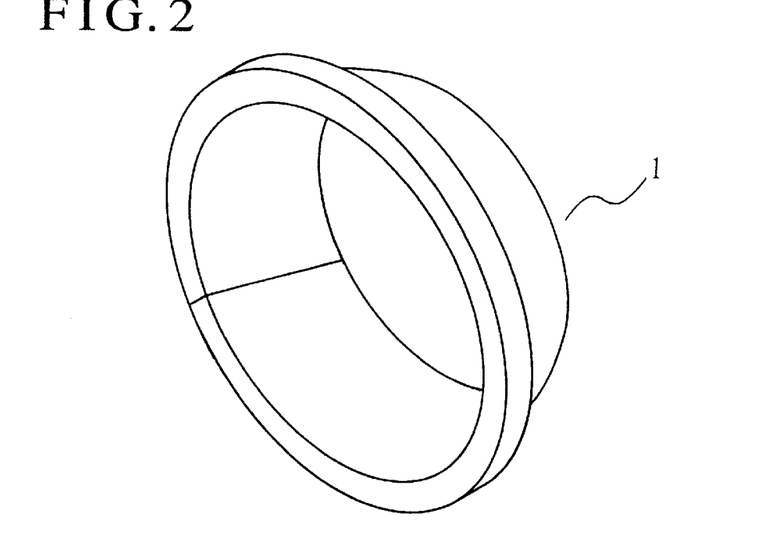
FIG. 2 is a perspective view of a tubular packing.

Then, this cylindrical intermediate product was introduced into a compression shaping mold of a compression shaping machine, and is compressed in a direction of the thickness of the sheet 11, thereby forming the tubular packing 1 shown in FIG. 2. As a result of this compression shaping operation, the expanded metal sheets 12 and 13 were pressed and embedded into the sheet 11, and also the juncture line 14 of the sheet 11 was bridged by the expanded metal sheet 13 disposed in offset relation to the sheet 11, and therefore there was provided the tubular packing 1 which was continuous over the entire circumference thereof, and this tubular packing 1 had excellent shape retention, and therefore was less susceptible to twisting deformation. During the compression shaping operation, the sheet 11 and the expanded metal sheets 12 and 13 themselves were compressed, and therefore the resultant tubular packing 1, formed into the predetermined shape as shown in FIG. 2, had a thin overall thickness of 0.6 mm.

Figure 5:
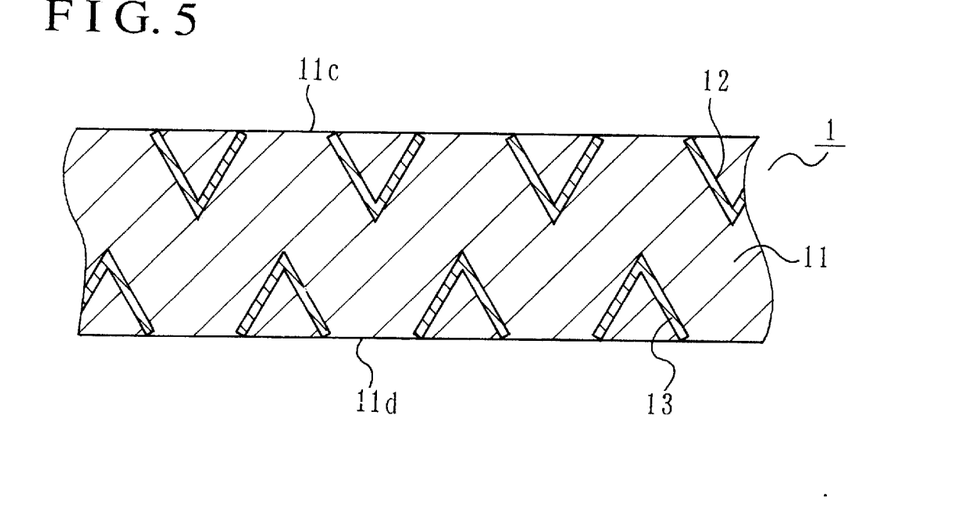
FIG. 5 is an enlarged, cross-sectional view of a portion of the tubular packing after a compression shaping operation.

The shaping pressure can be adjusted so that the expanded metal sheets 12 and 13 are exposed respectively to the opposite (inner and outer) sides 11c and 11d of the sheet 11 as shown in FIG. 5. By doing so, the exfoliated graphite and the exposed expanded metal 12, 13 are present in a coexisting manner in each of the inner and outer peripheral surfaces of the tubular packing 1.

The thus obtained tubular packing 1 was provided between the flanges 2a and 3a, and when an engine (not shown) was driven, high-temperature exhaust gas, flowing through the engine-side outer pipe 2, was discharged to the exterior via the inner pipe 3. The outer pipe 2 and the inner pipe 3 were heated to high temperatures by this high-temperature exhaust gas. At this time, vibrations of the outer pipe 2 occurred due to the driving of the engine, and vibrations of the outer pipe 2 were greatly alleviated by the resiliency of the compression springs 6 and the spring properties of the inner spherical portion 3b, and the inner spherical portion 3b and the outer spherical portion 2b repeatedly slided slightly relative to each other through the tubular packing 1. The vibrations, transmitted from the outer pipe 2 to the inner pipe 3, were further greatly dampened by the repeatedly-sliding tubular packing 1. The exfoliated graphite and the exposed expanded metal 12, 13 were present in a coexisting manner in the inner and outer peripheral surfaces of the tubular packing 1 disposed between and in sliding contact with the outer pipe 2 and the inner pipe 3 (see FIG. 5).

Therefore, in the tubular packing 1, the excellent sliding properties of the exfoliated graphite will not be lost, and the high wear resistance is achieved to thereby prevent the tubular packing 1 from being worn into a reduced thickness, thus preventing a backlash from developing, and therefore the tubular packing 1 has the satisfactory durability. As shown in FIG. 5, since the exfoliated graphite 11 is held between the two expanded metal sheet layers 12 and 13, the exfoliated graphite 11 is not severed for each mesh of the wire net (expanded metal sheet) layers, but is continuous over the entire area thereof, and therefore this exfoliated graphite 11 is less susceptible to separation even when an impact force is applied to the tubular packing.

Particularly, the tubular packing 1 is constituted by two expanded metal sheets 12 and 13 and one sheet 11 which are provided in the circumferential direction, and therefore this tubular packing 1 has a uniform thickness over the entire circumference thereof, and can provide high air-tightness.

In this embodiment, although the two expanded metal sheets 12 and 13, having the same thickness, are used as the wire nets, respectively, there may be used wire nets different in thickness and mesh from each other. Also, the tubular packing may have three or more wire net layers disposed therein.

Figure 6A:
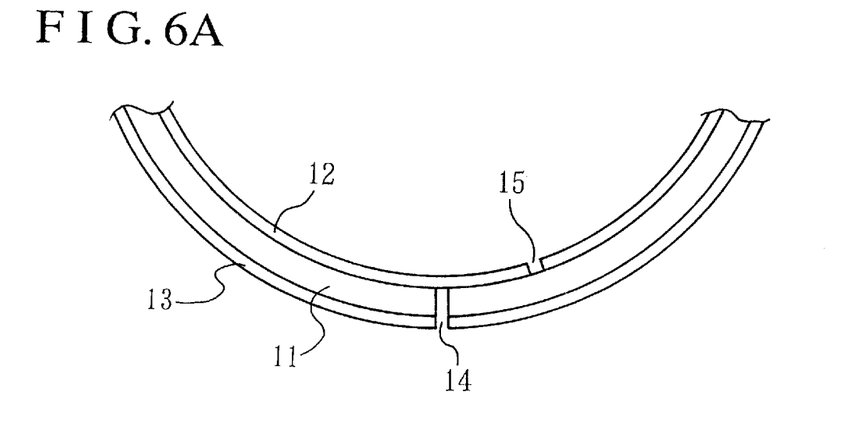
FIG. 6 is a fragmentary, enlarged, front-elevational view showing a sheet and wire nets stacked together in another tubular packing of the invention.
Figure 6B:
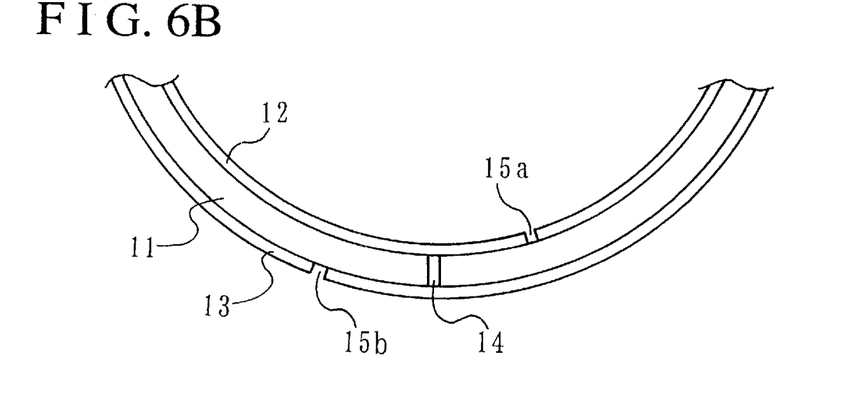

Further, as shown in FIG. 6(A), an expanded metal sheet 12 disposed at the inner side of the tubular graphite 11 was made to extend beyond the gap 14 of an exfoliated graphite sheet 11. In another modified tubular packing shown in FIG. 6(B), each of two expanded metal sheets 12 and 13 disposed respectively at the inner and outer sides of the tubular packing were both made to extend beyond the gap 14 of an exfoliated graphite sheet 11.

Figure 7:
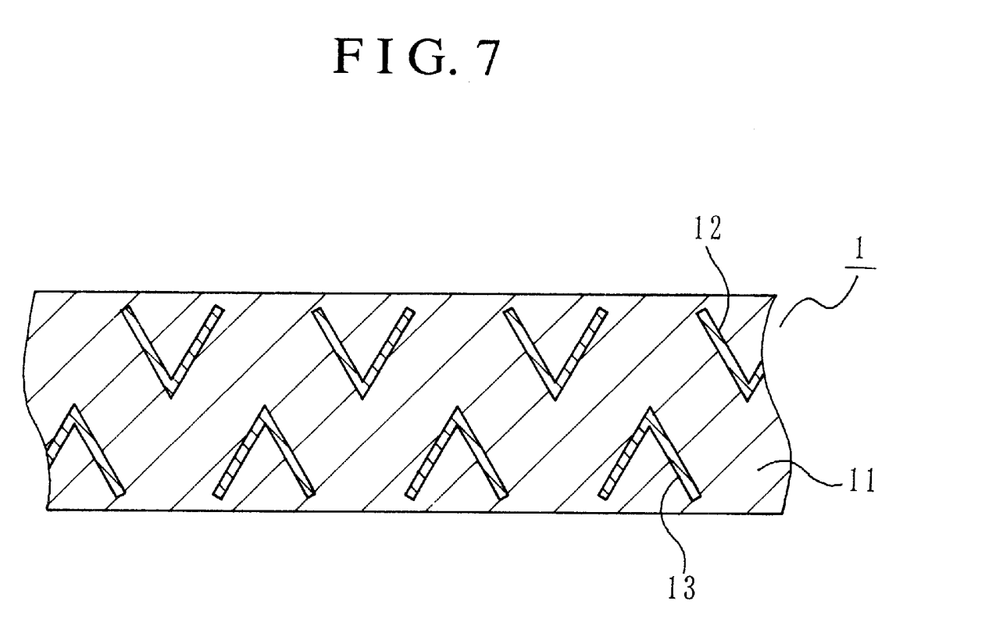
FIG. 7 is an enlarged, cross-sectional view of a portion of still another tubular packing after a compression shaping operation.

By suitably selecting the thickness of the sheet 11 and the thickness of the expanded metal sheets 12 and 13, or by increasing the compression pressure applied during the compression shaping operation, the two expanded metal sheets 12 and 13 can be completely embedded in the exfoliated graphite sheet 11 so that the two expanded metal sheets 12 and 13 are not exposed respectively to the opposite sides of the sheet 11, as shown in FIG. 7. With this construction, the tubular packing has enhanced conformability and sealing properties.

Second Embodiment

Figure 8:
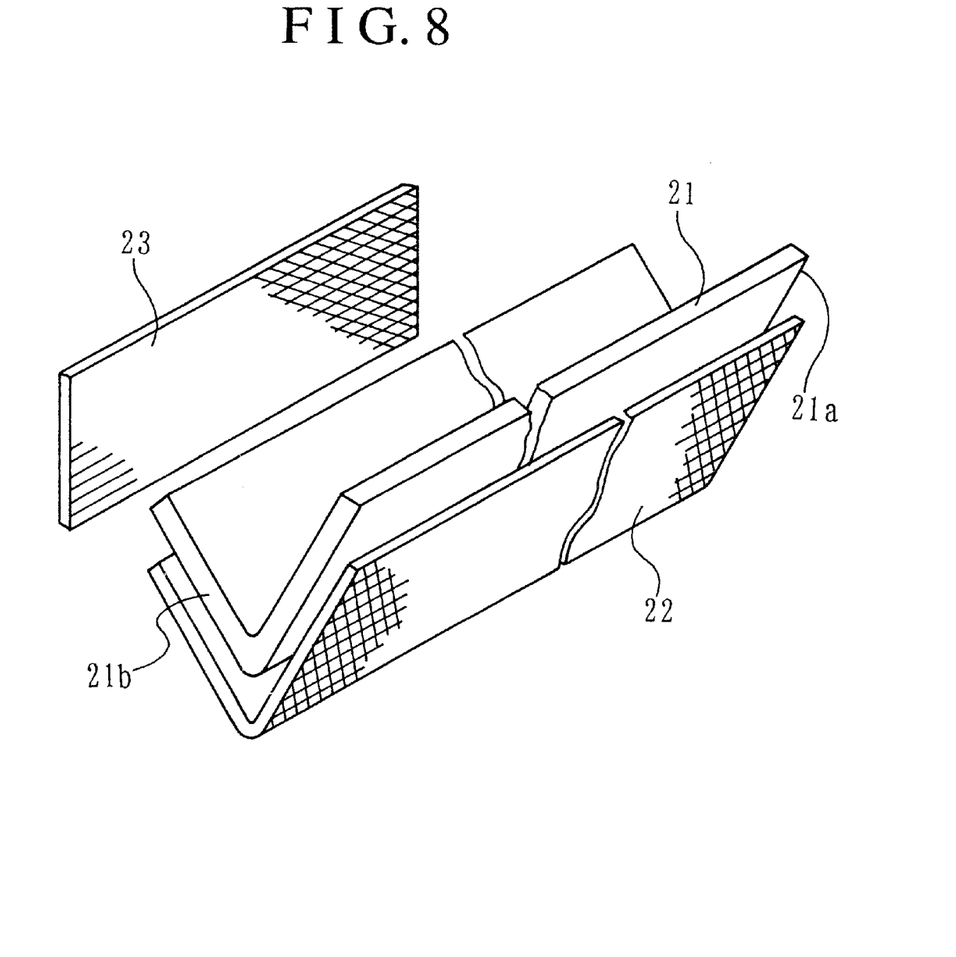
FIG. 8 is a perspective view showing a sheet and a wire net stacked together in a second embodiment of the invention.
Figure 9:
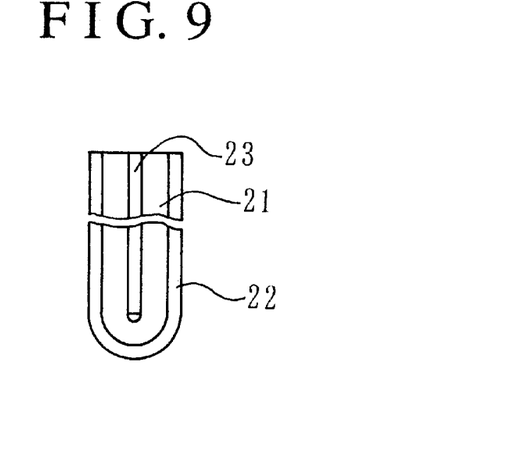
FIG. 9 is a side-elevational view showing the sheet and the wire net of the second embodiment in a folded state.

A second embodiment of the invention is explained regarding a tubular packing 1 of the first embodiment provided at the interconnecting portion of the exhaust conduit of the automobile. The tubular packing 1 was produced, as shown in FIG. 8, by the steps of preparing an exfoliated graphite sheet 21 of a generally rectangular shape having a thickness of 0.5 mm, preparing an expanded metal sheet 22 having a thickness of 0.3 mm and the same shape as the sheet 21, superposing the expanded metal sheet 22 on the reverse side of the sheet 21, and folding the two sheets 21 and 22 thus stacked together along their centerlines in such a manner that the expanded metal sheet 22 is disposed outside the folded sheet 21. Then, a thin connecting piece 23 (which is an expanded metal sheet in this embodiment) having a thickness of 0.1 mm was inserted between the folded portions of sheet 21 in such a manner that a substantially central portion of the connecting sheet piece 23 was located at one end edge of the sheet 21, and therefore the connecting piece 23 projected from the one end edge of the sheet 21. Then, by completely folding them, the sheets 21 and 22 were made to be in an intimate contact with the connecting piece 23 held between the folded sheet portions 21, as shown in FIG. 9.

Figure 10:
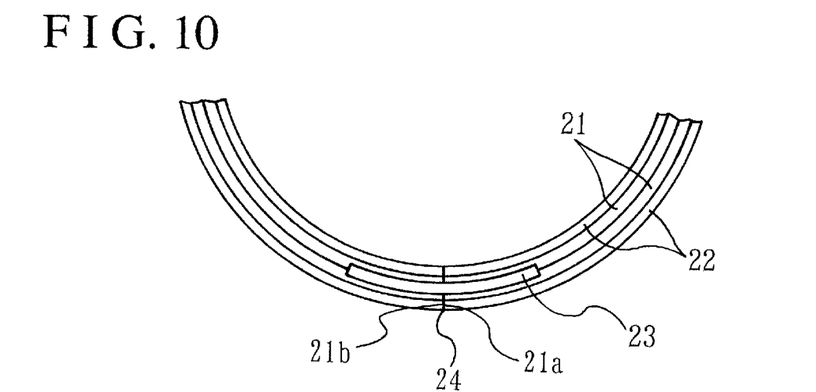
FIG. 10 is an enlarged, front-elevational view showing portions of the sheet and the wire net of the second embodiment curved into a tubular shape.

Then, the folded sheet 21 was curved and formed into a cylindrical shape, with the opposite end edges 21a and 21b of the sheet 21 butted together, in such a manner that the generally half portion of the connecting sheet piece 23 projecting from the sheet 21 was inserted into the folded sheet 21 from the other end edge thereof, thus interconnecting the opposite end edges of the sheet 21 (see FIG. 10). Then, this was introduced into a compression shaping mold of a compression shaping machine, and was compressed in a direction of the thickness of the sheet 21 to thereby be formed into a predetermined shape as described above. As a result of this compression shaping operation, the expanded metal sheet 22 was pressed and embedded into the sheet 21, and also a juncture line 24 defined between the opposite end edges 21a and 21b of the sheet 21 was bridged by the connecting sheet piece 23.

Figure 11:
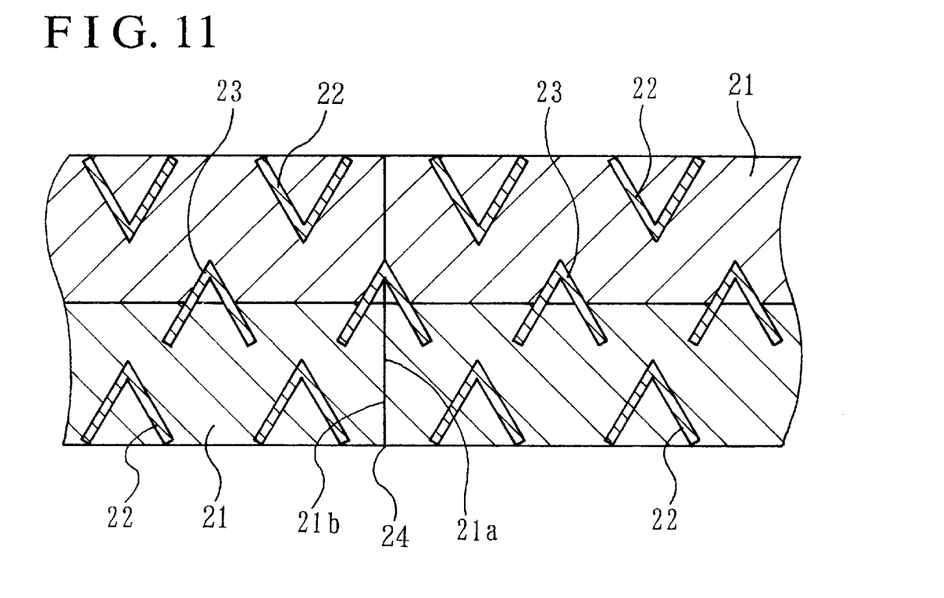
FIG. 11 is an enlarged, cross-sectional view showing a portion of the tubular packing of the second embodiment after a compression shaping operation.

The shaping pressure applied during the compression shaping operation can be adjusted so that the surface of the expanded metal sheet 22 is partially exposed to the inner and outer surfaces of the folded sheet 21 formed into a cylindrical shape, as shown in FIG. 11. By doing so, the exfoliated graphite sheet 21 and the exposed expanded metal 22 are present in a coexisting manner in each of the inner and outer peripheral surfaces of the tubular packing 1. Therefore, in the tubular packing 1, the excellent sliding properties of the exfoliated graphite will not be lost, and the high wear resistance is achieved, thereby preventing a backlash from developing, and therefore the tubular packing 1 has the satisfactory durability.

Like the tubular packing 1 of the first embodiment, the tubular packing 1 of this embodiment, when provided at the interconnecting portion of the exhaust conduit of the automobile, exhibits the excellent shape retention and durability.

Figure 12:
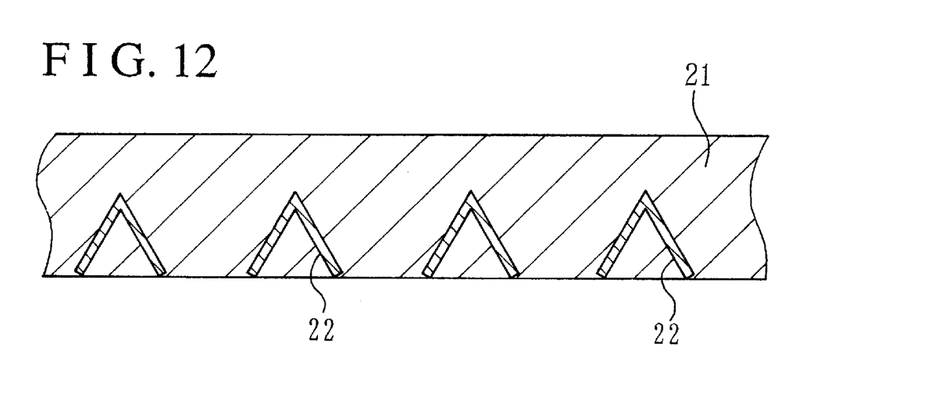
FIG. 12 is an enlarged, cross-sectional view of a portion of a modified sheet.

In this embodiment, the expanded metal sheet 22 was held in contact with the reverse side of the exfoliated graphite sheet 21, and the two sheets 21 and 22 were folded in two, and then were compressed and shaped as described above. However, there may be used a method (see FIG. 12) in which there is prepared a previously formed sheet comprising an exfoliated graphite sheet 21 and one expanded metal sheet 22 beforehand embedded in this sheet 21 by compression, and this previously formed sheet is cut into a predetermined shape, and this sheet is folded in two. In this method, since the expanded metal sheet 22 is beforehand embedded in the exfoliated graphite sheet 21, the folding operation and the setting of the sheet in the compression shaping mold can be effected easily.

Since this second embodiment is directed to the tubular packing of a bell-shape, the stretchable (expandable) wire net (expanded metal sheet) is used as the connecting sheet piece 23. However, in the case where the stretchability is not particularly required, a thin sheet can be used as the connecting sheet piece.

In the second embodiment, although one expanded metal sheet 22 was used, a plurality of expanded metal sheets 22 may be embedded in the exfoliated graphite sheet.

Although the present invention has been described above by way of the two embodiments (first and second embodiments), the following modifications may be made.

(1) In the first and second embodiments, the expanded metal sheets are used as the wire nets. The expanded metal sheets 12, 13, 22 and 23 each having meshes of rectangular cross section are combined together and have sharp edges, so that it becomes possible to enhance the ability of holding the exfoliated graphite sheet. For this reason, the expanded metal sheets are preferred, but the wire nets are not limited to the expanded metal sheet, and wire nets, formed by knitting wires, may be used.

(2) The exfoliated graphite sheet can be made of pure exfoliated graphite, and alternatively a suitable amount of a binder and a suitable amount of a solid lubricant may be added to the exfoliated graphite so as to enhance the holdability and sliding properties of the exfoliated graphite. For example, 10 wt. % of a binder (e.g. a phenolic resin) and 7 wt. % of a solid lubricant (e.g. graphite, boron nitride or calcium fluoride) may be added.

(3) Although the first and second embodiments are directed to the tubular packings 1 of a generally cylindrical, bell-shape used at the interconnecting portion of the exhaust conduit of the automobile, the present invention is not limited to such use and shape, and the packing can be formed into any other suitable shape.

What is claimed is:

1. A tubular packing comprising a tubular body of exfoliated graphite having end edges butt joined against each other without overlapping, a plurality of layers of wire net embedded in the exfoliated graphite, wherein at least one layer of said wire net interconnects said end edges of said exfoliated graphite so that the end edges are bridged by said at least one wire net layer, wherein the exposed portion of the wire net layer and the exfoliated graphite are present in a coexisting manner in each of inner and outer surfaces of said graphite body so that a part of each of the wire net layers located in the vicinity of the surfaces of the graphite body is exposed on each of the inner and outer surfaces of said graphite body.

2. A method of producing a tubular packing comprising the steps of:
    stacking a plurality of wire nets on opposite sides of a sheet of exfoliated graphite in truing-up relation thereto in such a manner that a part of at least one of said plurality of wire nets is projected from said sheet without being trued up, said sheet and said plurality of wire nets having substantially the same shape;
    curving and forming said stack into a tubular shape, with opposite end edges of said sheet butted together; and
    compressing said tubular stack in a direction of a thickness of said sheet so that said wire nets are embedded in said sheet and so that the opposite end edges of said sheet are interconnected and bridged by said part of said at least one wire net.

3. A tubular packing comprising a tubular body consisting of two exfoliated graphite layers each provided with a layer of wire net embedded therein, said graphite layers having end edges butt joined against each other without overlapping, and a connecting piece layer inserted between the two graphite layers so that said end edges are interconnected and bridged, wherein the exposed portions of said wire net layers and the exfoliated graphite are present in a coexisting manner in each of inner and outer surfaces of said tubular body so that a part of each of the wire net layers located in the vicinity of the surfaces of the graphite body is exposed on each of the inner and outer surfaces of said graphite body.

4. The tubular packing of claim 3 made by:
    stacking a wire net on a sheet, made of exfoliated graphite, in truing-up relation thereto, said sheet and said wire net having substantially the same shape;
    holding said stack in half to thereby have two folded portions;
    inserting a connecting sheet piece between said folded portions in such a manner that said connecting sheet piece projects from one end edge of said sheet;
    subsequently curving and forming said stack into a tubular shape, with the opposite end edges of said sheet butted together, in such a manner that portion of said connecting sheet piece, projecting from said one end edge of said sheet, is inserted between other end portions of another end edge of said folded sheet; and
    wherein said tubular packing is a shape compressed in a thickness direction of said sheet of said stack of tubular shape.

5. The tubular packing of claim 3 made by:
    folding a sheet of exfoliated graphite, having a wire net embedded therein, in half so that said wire net is located in the outer surface portions of said folded sheet;
    inserting a connecting piece between portions of said folded sheet so that said connecting sheet piece projects from one end edge of said sheet;
    curving and forming said folded sheet into a tubular shape, with the opposite end edges of said sheet butted together, in such a manner that a portion of said connecting sheet piece projecting from said one end edge of said sheet is inserted between other end portions of another end of said folded sheet; and
    wherein said tubular packing is a shape compressed in a thickness direction of said sheet of said stack of tubular shape.

6. A method of producing a tubular packing comprising the steps of:
    stacking a wire net on a sheet, made of exfoliated graphite, in truing-up relation thereto, said sheet and said wire net having substantially the same shape;
    holding said stack in half to thereby have two folded portions;
    inserting a connecting sheet piece between said folded portions in such a manner that said connecting sheet piece projects from one end edge of said sheet;
    subsequently curving and forming said stack into a tubular shape, with the opposite end edges of said sheet butted together, in such a manner that portion of said connecting sheet piece, projecting from said one end edge of said sheet, is inserted between other end portions of another end edge of said folded sheet; and
    compressing said tubular stack in a direction of a thickness of said sheet so that said wire net is embedded in said sheet and so that the opposite end edges of said sheet are interconnected and bridged by said connecting sheet piece.

7. A method of producing a tubular packing comprising the steps of:
    folding a sheet of exfoliated graphite, having a wire net embedded therein, in half so that said wire net is located in the outer surface portions of said folded sheet;
    inserting a connecting piece between portions of said folded sheet so that said connecting sheet piece projects from one end edge of said sheet;
    curving and forming said folded sheet into a tubular shape, with the opposite end edges of said sheet butted together, in such a manner that a portion of said connecting sheet piece projecting from said one end edge of said sheet is inserted between other end portions of another end of said folded sheet; and
    compressing said tubular sheet in a direction of a thickness of said sheet so that said wire net is embedded in said sheet and so that the opposite end edges of said sheet are interconnected and bridged by said connecting sheet piece.

8. The tubular packing of claim 1 made by:

stacking a plurality of wire nets on opposite sides of a single sheet of exfoliated graphite in truing-up relation thereto in such a manner that a part of at least one of said plurality of wire nets is projected from said sheet without being trued up, said sheet and said plurality of wire nets having substantially the same shape;

curving and forming said stack into a tubular shape, with opposite end edges of said sheet butted together; and wherein said tubular packing is a shape compressed in a thickness direction of said sheet of said stack of tubular shape.

* * * * *